Nov. 15, 1966    H. E. BALSIGER    3,285,679
PRECISION SPINDLE MOUNTING

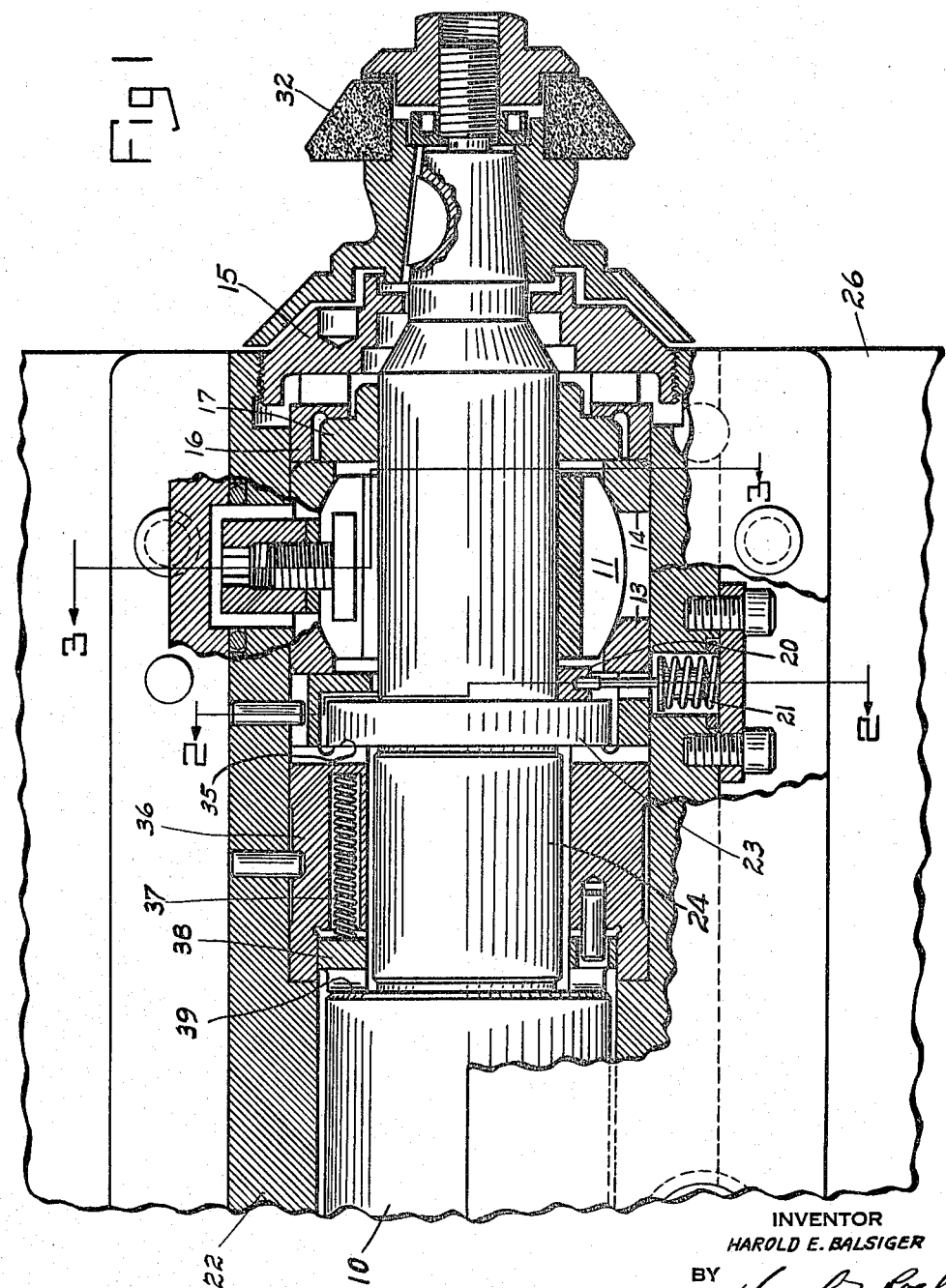

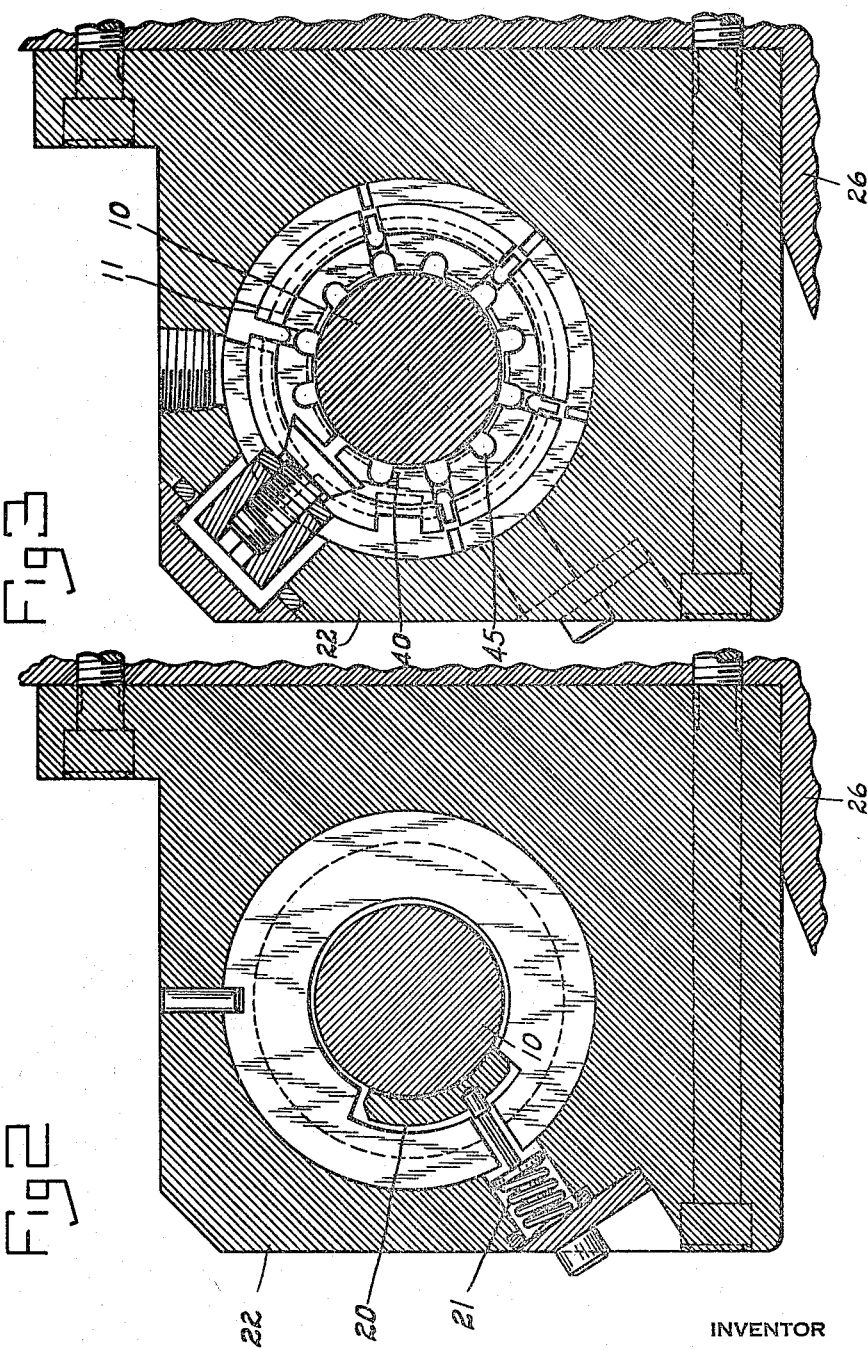

Filed Aug. 16, 1965    7 Sheets-Sheet 3

INVENTOR
HAROLD E. BALSIGER
BY
ATTORNEY

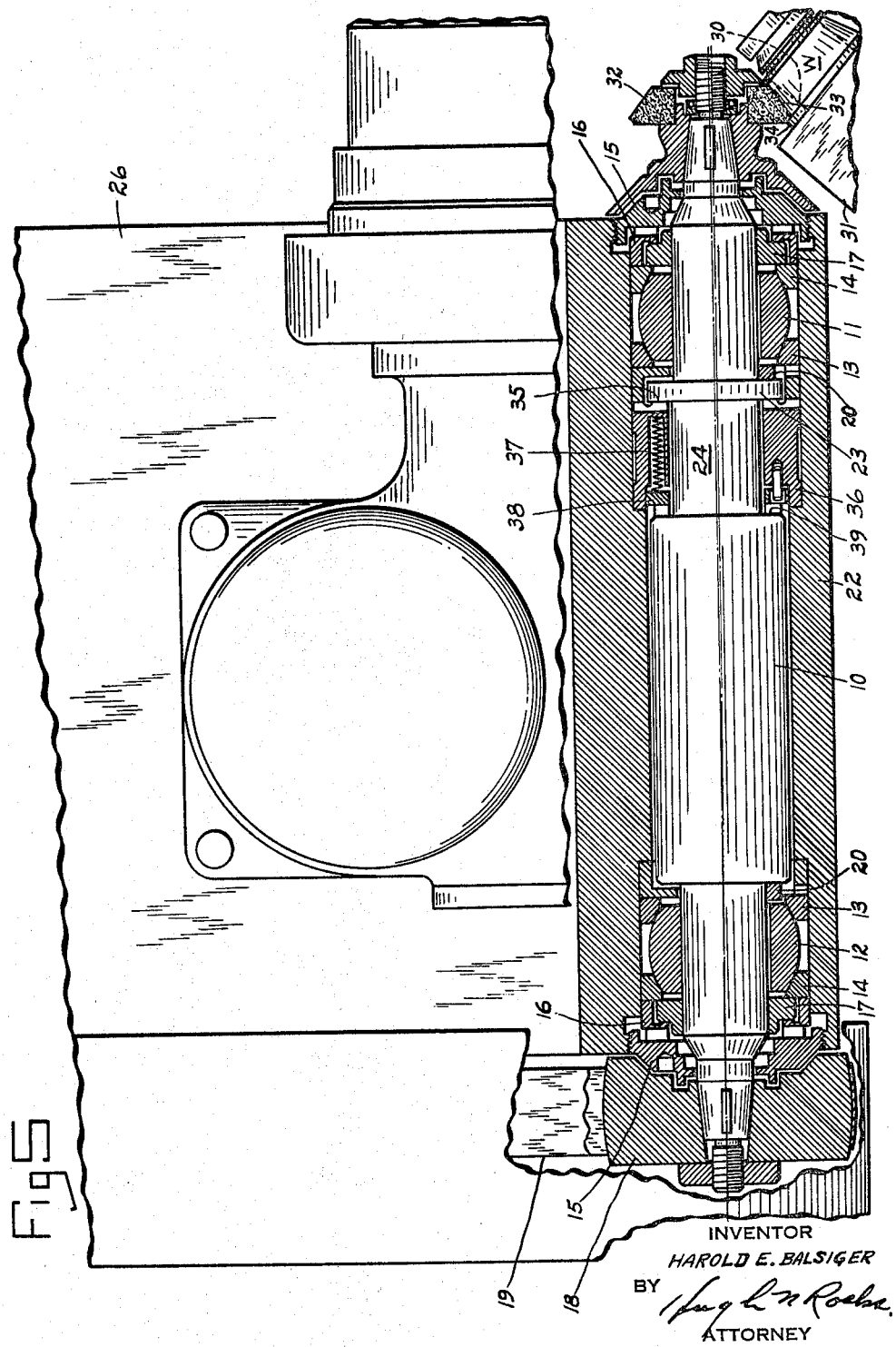

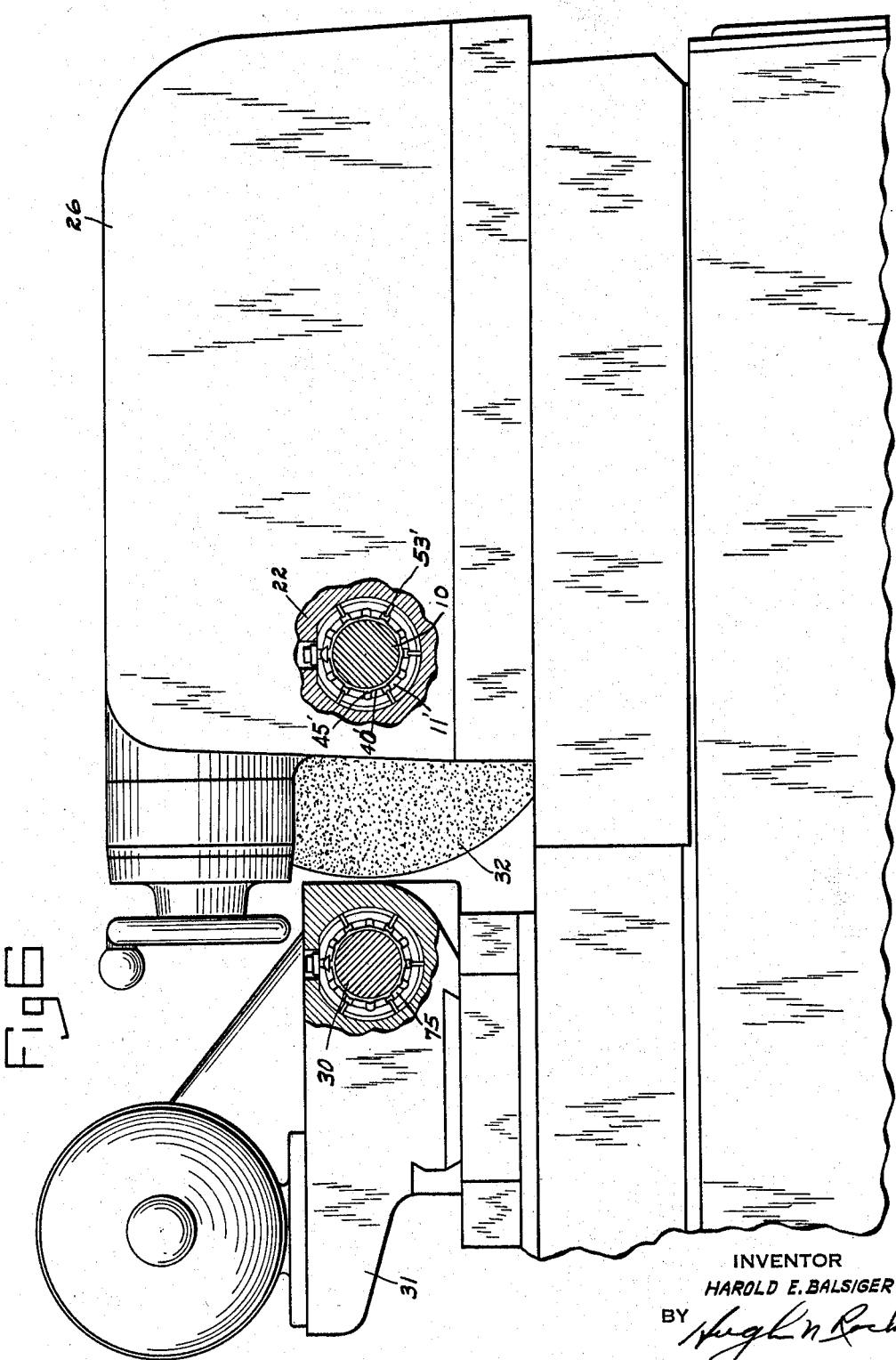

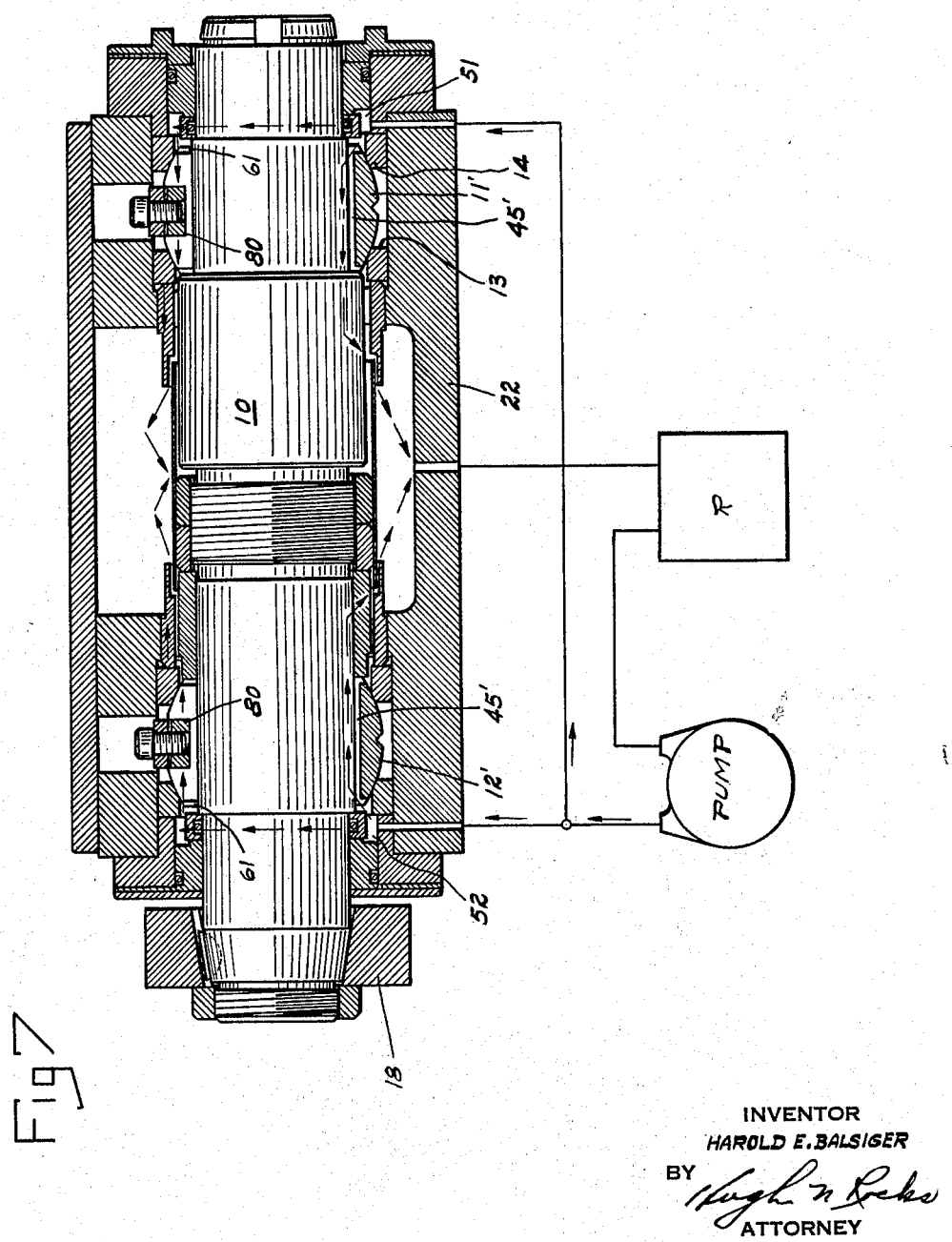

Nov. 15, 1966 H. E. BALSIGER 3,285,679
PRECISION SPINDLE MOUNTING
Filed Aug. 16, 1965 7 Sheets-Sheet 7
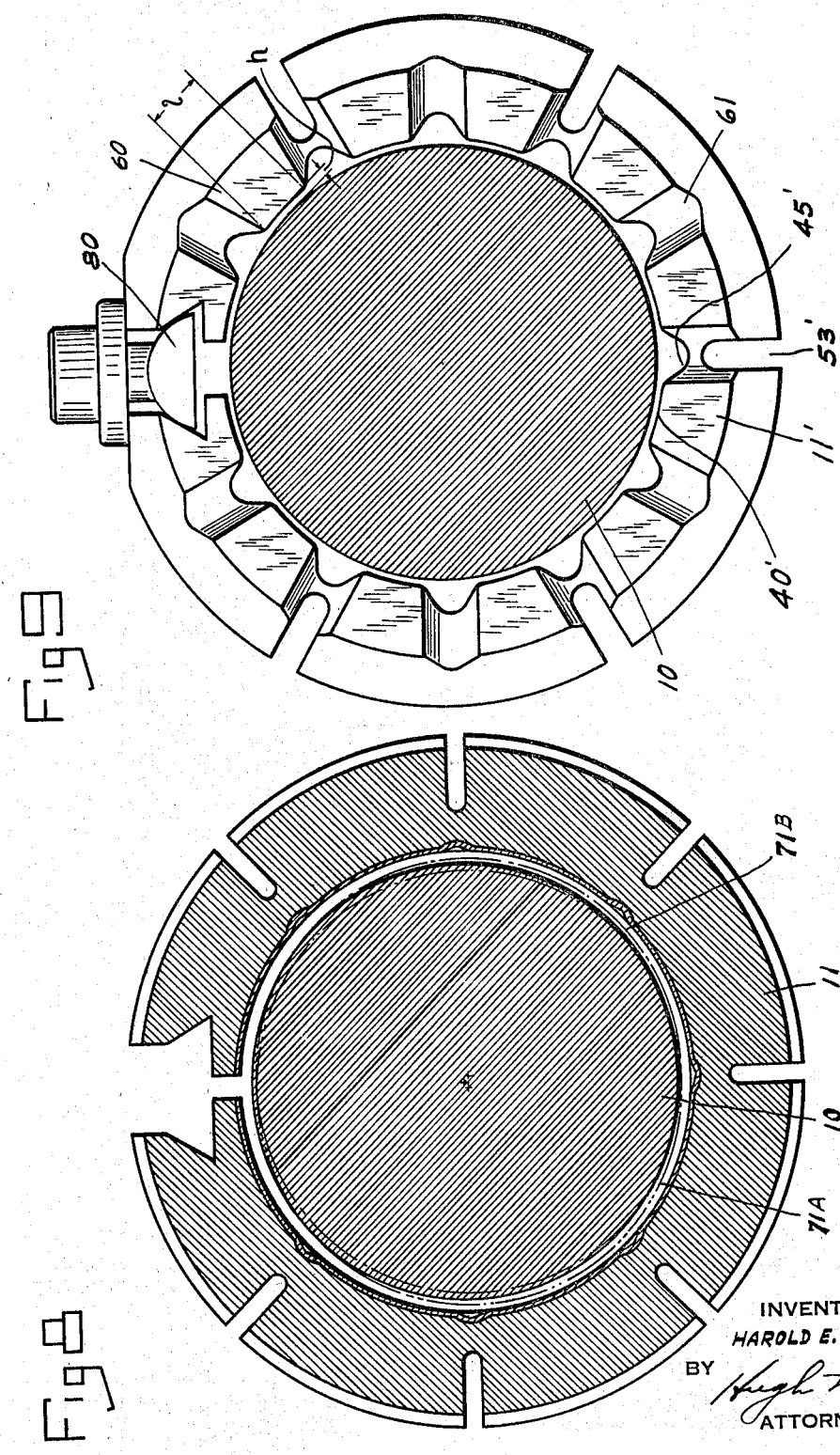
INVENTOR
HAROLD E. BALSIGER
BY
ATTORNEY United States Patent Office 3,285,679
Patented Nov. 15, 1966

3,285,679
PRECISION SPINDLE MOUNTING
Harold E. Balsiger, Waynesboro, Pa., assignor to Landis Tool Company, Waynesboro, Pa.
Filed Aug. 16, 1965, Ser. No. 480,053
7 Claims. (Cl. 308—121)

This is a continuation-in-part of U.S. application, Serial No. 161,633, filed December 22, 1961, now abandoned.

This invention relates to bearings, particularly journal bearings, but including bearings for linearly moving members, and more particularly to bearings of the type in which the load is supported on a film in which pressure is generated in response to movement of the moving member.

A primary purpose for a bearing member is to support a moving member for movement in a plane or about an axis with a minimum of displacement from said plane or said axis. For the purpose of illustration, this invention will be described in its application to the support of rotating journals and spindles.

In the prior art, there are two general types of plain or oil film bearings:

(1) The journal bearing having a surface in which a single wedge-shaped oil film is formed between the journal and bearing.

(2) The bearing in which wedge-shaped oil films are formed between a rotating journal and peripherally spaced bearing surfaces or shoes which may be tiltable or fixed and which are designed to provide an oil film in which the pressure increases progressively as the oil film is forced into the small end of the wedge to provide pressure on each shoe for supporting the journal.

A third type of bearing developed more recently, possesses some of the characteristics of both the single film bearing and the pivoted shoe-type bearing, but is more effective than either for limiting spindle displacement. This bearing, which is disclosed in U.S. Patent 2,277,167, granted March 24, 1942, also depends on wedge-shaped oil films.

These bearings are all subject to at least two limitations:

(1) A wedge-shaped oil film which is necessary to provide a load sustaining pressure.

(2) A minimum clearance between the journal and bearing which is necessary to prevent failure of the bearing or oil film. Such a clearance permits a corresponding displacement of the journal. This displacement, in turn, constitutes a limit on the quality of workpieces produced by the machine of which the journal is a part.

Conventional bearing and lubrication practice is based on the theory that bearing failure is due to mechanical rupture of the oil film which results in metal to metal contact and a rapid increase in bearing temperature. According to this theory, the only way to avoid bearing failure is to use a relatively large clearance and a correspondingly thick oil film. A bearing conforming to these requirements will permit substantial radial displacement of a spindle. Thus, the means for avoiding bearing failure constitutes a barrier in the way of reducing radial displacement and improving the radial stability of a spindle.

This invention is based on a new theory, now a fact, that oil film failure is the result rather than the cause of excessive temperature rise. In accordance with this proven theory, oil film thickness may be reduced to the point where radial displacement of the journal is substantially eliminated without any risk of bearing or oil film failure.

The bearing of this invention consists essentially of peripherally spaced grooves defining rigid peripherally spaced bearing pads. Provision is made for adjusting the pads as a unit radially of the spindle. This bearing differs from previous bearings in this the peripheral dimension of the pads is determined by the oil film temperature rise, oil film thickness, spindle speed, and other factors. This determination of pad dimension is based on the fact that oil film failure is caused by excessive rise in oil film temperature, which if permitted to continue because of a long oil film, will reach a point where the oil film explodes, metal to metal contact occurs, and the bearing fails.

According to this invention, each bearing pad is limited in its peripheral dimension so that temperature rise in the oil film is stopped at a relatively low point when the oil film emerges from the bearing pad. This limitation of the peripheral dimension of a bearing pad produces two important results:

(1) It does away with any low limit for clearance or oil film thickness because regardless of the oil film thickness and the rapid rise in oil film temperature which accompanies reduction in oil film thickness, the bearing pad may be provided with the proper peripheral dimension to keep the oil film temperature rise under control.

(2) The ability to use thin oil films makes possible the use of parallel surface bearings with uniform thickness oil films instead of wedge-shaped oil films. In the past, this type of oil film was considered to be incapable of generating pressure sufficient to sustain most bearing loads. However, it was observed that the load sustaining pressure generated in these bearings increases as the film thickness decreases. The fact that reduction in film thickness resulted in failure of the oil film, made it impossible to obtain any useful information about the behavior of this type of bearing.

The study of the behavior of the parallel surface bearings as a result of this invention indicates that a uniform thickness oil film operates on an entirely different principle than the wedge-shaped oil film and for a given oil film thickness will generate load sustaining pressures far greater than a wedge-shaped oil film. The uniform thickness oil film operates on the principle that the heat generated by fluid friction in the oil film, causes expansion of the oil film. This phenomenon occurs to best advantage in oil films substantially thinner than the recommended minimum for conventional oil films. This expansion of oil film produces a pressure between the journal and bearing pad which is capable of supporting much higher loads on the journal than wedge-shaped oil films and, therefore, is more effective in preventing displacement of the journal.

It is, therefore, an object of the present invention to provide in a bearing a condition in which displacement of the movable member transversely of the bearing member, is substantially eliminated.

Another object is to provide a bearing in which the oil film thickness is less than the above mentioned minimum required with conventional wedge-shaped oil films.

Another object is to provide a bearing in which the load sustaining pressure in the oil film is produced by heat of the fluid friction generated by the relative movement of the coacting member.

Another object is to provide means for controlling the temperature rise in such an oil film.

Another object is to provide means for controlling the temperature of the circulating oil so that the initial temperature of each oil film formed is substantially constant.

This invention may be described as a bearing system in which a bearing member has one or more rigid bearing pads, a movable member which moves in co-acting relation with said pad or pads, a reservoir which contains a body of lubricating fluid, means to circulate said lubricating fluid through the system and around said pad or pads, and a heat exchange capacity which may determine some of the dimensional characteristics of the bearing. The movable member carries a portion of the circulating fluid between itself and the pad, providing a hydro-dynamic film corresponding in width ($b$) and length ($l$) to said pad or pads and having a thickness ($h$) which is provided by adjusting said pads and said movable member toward one another to provide an oil film thickness ($h$) which is substantially irreducible for all normal forces acting on the movable member.

This invention relates to a bearing having multiple grooves defining one or more rigid (non-tiltable) bearing pads for rotatably supporting a journal. The co-acting surfaces of the journal and bearing pads are parallel or concentric. Bearings of this type are generally referred to as parallel surface bearings and as having uniform thickness oil films as distinct from bearings arranged to provide wedge-shaped oil films. In the past, parallel surface bearings have been given only casual attention, primarily because authorities could not account for their behavior, particularly their load sustaining characteristics. Load sustaining characteristics of parallel surface bearings are more evident in thin or hard films. However, such films could not be studied effectively because of a tendency to fail. This invention, by making possible the use of hard films, has also made possible a study of parallel surface bearings which discloses decided advantages over bearings using wedge-shaped oil films.

In the development of this invention, it has been found that the load sustaining capabilities of parallel surface bearings depend on expansion of the oil in the oil film in response to heat generated by fluid friction. Such bearings operate to best advantage with a thin hard oil film because in such films, the thinner and harder the film, the more rapid the rise in temperature and the higher the pressure generated in the oil film. One characteristic of thin oil films is the fact that they undergo little change in thickness when subjected to high loads. This can be shown mathematically as will be discussed later. The characteristic of thin oil films is referred to hereafter as "hardness" and the oil films are referred to as "hard" oil films.

Hard oil films, by their nature, are of relatively small volumn. In operation, heat is generated in the oil film by fluid friction. The rapid rise of temperature in the oil film because of its small volume, expands the oil to provide the pressure to support the working loads on the journal. However, this temperature rise must be kept under control. In conventional bearings, with no provision for oil film temperature control, a hard oil film is impossible. The hard film, therefore, has no practical application unless this temperature rise can be controlled.

The means for controlling this temperature rise is the main feature of this invention. Aside from this control of oil film temperature rise, the ability to use a hard oil film successfully is, by itself, an outstanding advance in bearing and lubrication practice. It consists in limiting the duration or length of the oil film so that the oil film is discontinued or discharged while its temperature is well below the point of destruction. This point of destruction can be found in the known physical properties of the oil being used. Specifically, the invention consists of limiting the peripheral dimension of the bearing pad to a calculated value, which will be discussed later, so that the heated oil film is discharged long before its temperature reaches the vapor point.

This invention represents such a radical departure from current practice that there is no pertinent prior art. The prior art has little to say about oil film temperature and nothing about how to control it. None of the prior art relating to pivoted and other shoe-type bearings considers the problem of excessive temperature rise in an oil film. It is, therefore, safe to state that in the prior art, reference to thin oil films means thin oil films which are thick enough to operate within a safe temperature range. Regardless of what claims are made in the prior art for reduction of radial displacement by the use of thin oil films, the fact remains that no one has ever before successfully operated a bearing with a clearance less than the generally accepted minimum.

On page 219 of Dudley D. Fuller's "Theory and Practice of Lubrication for Engineers," copyright 1956 by John Wiley & Sons, Inc., New York, there is a table of minimum fits and clearances recommended for journals of various diameters. For example, the minimum clearance recommended for a 4½" spindle operating at a speed in excess of 600 r.p.m., is .0038". In terms of oil film thickness, this would be .0019". With the bearing of this invention, the oil film thickness for the same diameter spindle is .00015" or less than 1/10 of the corresponding dimension for conventional bearings. As another example, the recommended clearance for a certain spindle and a conventional bearing is .0018". This includes a certain margin of safety. If a smaller clearance, say .0017", is used, the bearing will probably function satisfactorily. However, if the clearance is reduced to .0015", a reduction of only .0002", the bearing would probably fail. In this invention, the same spindle with the new bearing has a clearance of .0003" or an oil film thickness between the spindle and each bearing pad of .000150" or ⅙ the recommended or conventional clearance.

FIG. 1 is a partial sectional plan view of a grinding wheel spindle showing means for holding the spindle in predetermined fixed relation to the spindle bearing.

FIG. 2 is a section on line 2—2 of FIG. 1.

FIG. 3 is a section on line 3—3 of FIG. 1.

FIG. 5 is a plan view, partly in section, showing an entire wheel spindle mounting.

FIG. 6 shows a conventional grinding machine in which the invention is applied to the work drive spindle as well as to the grinding wheel spindle.

FIG. 7 is a sectional front elevation showing one method of circulating oil through the bearing.

FIG. 8 is a sectional elevation showing a bearing similar to that shown in U.S. Patent 2,277,167 with the difference between the bearing and spindle diameters exaggerated for the purpose of comparison with the present invention.

FIG. 9 is an end elevation, partly in section, showing the comparative difference in diameter between the spindle and bearing as being substantially less than that of FIG. 8.

Figure 4:
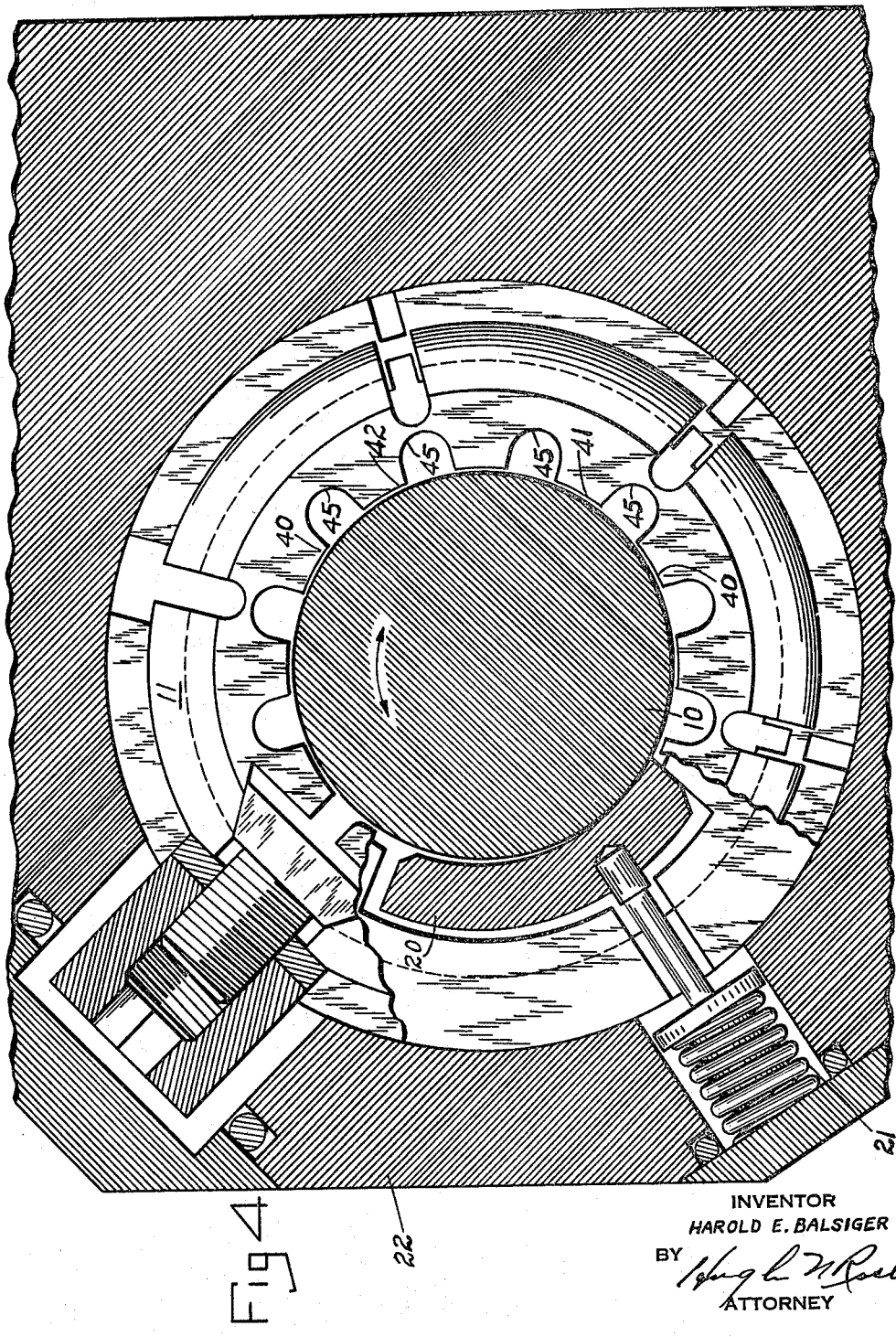
FIG. 4 is an enlarged section, partly on line 2—2 and partly on line 3—3 of FIG. 1.

In its preferred form, this invention may be described as a one-piece bearing ring having on its inner surface peripherally-spaced grooves defining peripherally-spaced bearing pads. The bearing is arranged in any suitable manner for radial adjustment to provide a space between the bearing and the rotating member for an oil film of predetermined thickness which is substantially less than the recommended clearance and which is not subject to change in response to the normal load on the rotating member. Because of its smaller volume, the oil film formed between each pad and the spindle is subject to relatively rapid temperature rise. This temperature rise must be kept under control to avoid failure of the oil film. Such control is provided by this invention and consists in selecting the peripheral dimension of each bearing pad so that the oil film is discharged long before the temperature reaches the danger point. It is the ability to control oil film temperature rise which makes possible the use of previously impossible hard oil films and parallel surface bearings. The invention also involves the immediate removal of the hot oil film as it emerges from each bearing pad by the lower temperature oil circulating through the grooves so that the heat is not transmitted to the oil film entering the next bearing pad.

Spindle 10 is rotatably mounted in bearing members 11 and 12 in housing 22 which, in turn, is a portion of wheelbase 26. Any of the well known feed mechanisms may be used to advance and retract wheelbase 26. Each of the bearings 11 and 12 is supported in axially, adjustable, retaining rings 13 and 14.

Pulley 18 on one end of spindle 10 has a belt 19 connected to a motor (not shown). Grinding wheel 32 is mounted on the other end of spindle 10. This particular grinding wheel is shaped to grind both the tapered raceway 33 and the flange portion 34 of workpiece W which is a tapered roller bearing inner ring. Workpiece W is rotated by work spindle 30 rotatably mounted in headstock 31 in bearings 75 which are similar to bearings 11 and 12.

Means for adjusting bearings 11 and 12 radially toward and from spindle 10 is substantially the same as that disclosed in greater detail in U.S. Patent 2,277,167. Briefly, rings 13 and 14 are urged toward one another in engagement with the outer spherical surface of bearing 11 by nut 15 threaded in housing 22 which applies an axial force on said rings between nut 15, bearing clamp retainer 16, and thrust collar 23 on spindle 10. Retainer 16 also holds seal 17 against ring 14. The inner portions of said rings 13 and 14 are formed to provide a cam action against the outer surface of said bearing to adjust said bearing radially inwardly toward spindle 10.

Bearing 11 is split to permit said radical adjustment. Wedge bolt 80 serves to adjust said bearing outwardly. A similar combination of nut, retainer and ring is used to adjust bearing 12 at the pulley end of spindle 10. Since both bearings are identical, the remainder of the description will refer only to bearing 11.

The bearing surface of each bearing member consists of peripherally spaced grooves 45 defining peripherally spaced bearing pads 40 shaped for maximum rigidity. Pads 41 and 42 are similar to pads 40, but have a secondary function in some circumstances. The peripheral dimension of each bearing pad is identified by ($l$). The oil film thickness or the space between a bearing pad 40 and spindle 10 is identified as ($h$).

For ease of manufacture, pads and grooves of similar peripheral dimensions are desirable. However, they may be made to any suitable dimension in order to obtain a particular objective so long as the pad dimensions conform to requirements for limiting oil film temperature rise. Also, the bearing surface of each pad is preferably arcuate in shape with the leading and trailing edges rounded or chamfered as shown in FIG. 9.

FIGS. 8 and 9 are intended to provide a comparison between the most advanced of conventional bearings and the bearing of this invention. In FIG. 8, dotted line 71a indicates the position of the rotating spindle under no load conditions. Dotted line 71b shows the position of the rotating spindle under a grinding load. The purpose of FIG. 8 is to show the difference in spindle and bearing diameters or clearance considered necessary to prevent breakdown of the oil film. Thus, in order to provide the proper lubrication for this type of bearing, it is necessary to accept the disadvantage of radial displacement of the spindle.

In the bearing of this invention shown in FIG. 9, the space between the spindle and each bearing pad is much smaller than that of FIG. 8 and is filled with a relatively thin oil film maintained under pressure by rotation of spindle 10. This oil film is much thinner than the space between the spindle and bearing in FIG. 8, and because it is so thin, it is subject to only minute reduction in this dimension when the spindle is subjected to external radial loads. For all practical purposes, such an oil film prevents radial displacement of spindle 10. A bearing with such an oil film might be described as having zero running clearance and a bearing material having the low friction co-efficient of oil. As shown in FIG. 9, the grooves and pads of the cylindrical portions of the bearing have counterparts in the annular end surface of the bearing which, in effect, are extensions of the grooves 45 and pads 40. These annular pads 60 and grooves 61 co-act with an end thrust member such as collar 23 on spindle 10 in substantially the same manner as the pads 40 and grooves 45 co-act with the cylindrical portion of spindle 10.

For certain applications, special means is provided for counter-acting the effect of belt pull and feeding load on spindle 10 as well as the effect of relieving one or both of these forces. It consists of shoes 20 mounted adjacent the inner end of each bearing member 11 and 12 and held against spindle 10 by means of spring 21. Shoe 20 is positioned at such an angle as to counteract the force of the belt pull at the wheel end of spindle 10 and also to hold said spindle at all times in the angular position in which it would normally be held during a grinding operation in response to the load imposed on spindle 10 by the feeding movement of the wheel support against the work.

The effect of spindle expansion on the longitudinal position of grinding wheel 32 is minimized by locating a thrust collar 23 on spindle 10 adjacent the inner end of the wheel and spindle bearing member 11. The means for pre-loading the spindle 10 for thrust, consists of sleeve 36 and thrust washer 38, both of which are split for assembly on reduced portion 24 on spindle 10. Sleeve 36 is mounted in fixed axial position in housing 22. Washer 38 is slidably mounted in sleeve 36 and held against shoulder 39 of spindle 10 by circumferentially-spaced springs 37. Springs 37 apply a load on shoulder 39 by means of washer 38. This load is transmitted through spindle 10 and collar 23 to thrust surface 35 of sleeve 36 so that the thrust load is divided between shoulder 39 and surface 35.

OPERATION

According to the present invention, bearings 11 and 12 are each adjusted by nut 15 and rings 13 and 14 to provide an oil film thickness in a range, for example, .000050″ to .000150″, which is substantially less than that of the minimum equivalent dimension recommended for conventional bearings including pivoted shoe-type bearings. Such an oil film thickness would be far below the minimum operable thickness even in the bearing of U.S. Patent 2,277,167. Oil which has preferably been cooled by radiation or refrigeration in reservoir R is introduced into spaces 51 and 52 (FIG. 7) by pump P at a relatively low pressure sufficient to provide rapid circulation of the oil through grooves 45 and 53 in said bearings. A small portion of the oil passing through each groove 45 is carried between the rotating spindle and each of said bearing pads in the form of an oil film. Initial temperature of the oil film is the same as that of the circulating oil in the grooves. As the oil film passes across the pad, the temperature increases rapidly due to fluid friction. In response to this increase in temperature, the oil expands and exerts pressure between the spindle and bearing pads. While the temperature of the oil increases rapidly, the peripheral dimension of the bearing pad is such that the oil film emerges from the pad at a temperature well below the point at which the oil film changes to vapor. The hot oil film emerges from the bearing into the oil circulating through the grooves and is rapidly carried away so that it does not influence the temperature of the oil entering the next bearing pad.

After passing through said grooves, the oil is returned to reservoir R as shown in FIG. 7. The oil may pass from each bearing to discharge, as shown, or it may pass from one bearing to the other and then to discharge. The specific path of oil through the bearing system is not critical. It is necessary only that the path be such that the oil passes through the bearings and removes the hot oil film emerging from each bearing pad to a point or area of dissipation.

The bearing of this invention is initially adjusted to provide a relatively hard oil film, for example, one having a thickness of .000150″. Such an oil film is subject only to minute reduction in thickness and, therefore, it is effective to prevent radial displacement of the spindle. (See equation for ΔT.)

The following chart illustrates the displacement of a journal with a wedge-shaped oil film and with a hard oil film:

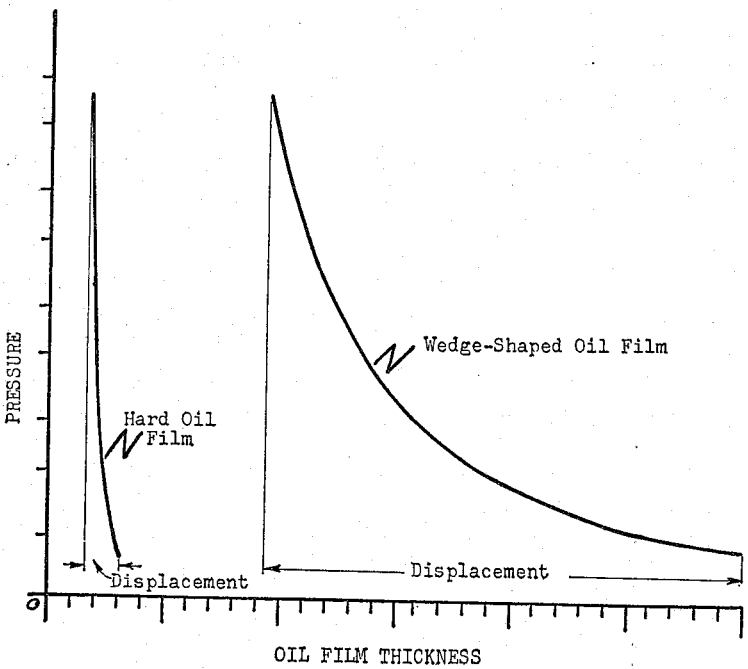

OIL FILM THICKNESS

The temperature of the hard oil film rises rapidly in response to rotation of the spindle. For the bearing to function successfully, the circumferential width ($l$) of each bearing pad is such that the oil film emerges from the pad while its temperature is well below the breakdown point. By thus controlling the oil film temperature rise, the barrier which formerly confined the bearing designer to an area of minimum clearance, is now removed and he is free to select the clearance or oil film thickness which best suits his purpose.

With the bearing of this invention, for even the thinnest oil film, the temperature rise stops when the oil film emerges from the pad. As the oil film passes between the bearing pads and the spindle, the temperature rise in the oil film causes the oil to expand and thus provide pressure for supporting a grinding or other load on the spindle.

Having solved the problem of controlling the temperature rise in the oil film, there is still the problem of dissipation of the heat generated in the oil film. A relatively large volume of low temperature oil is circulated through the grooves 45. (See equation for $Q_1$.) A smaller part of the oil film is drawn between each of the pads 40 and spindle 10 by rotation of said spindle to form an initially low temperature oil film. The heat generated in this oil film is not given an opportunity to increase the temperature of the oil film (ΔT) more than the predetermined amount before the oil film is discharged into the low temperature oil flowing through the next groove. (See equation for ΔT.)

The circulating oil in the grooves carries away the relatively small volume of the hot oil film, and in so doing, also carries away heat which might have been absorbed from the oil film by the bearing and spindle. The heat of the emerging oil film has little or no effect on the initial temperature of the oil film entering the next pad. In order to accomplish this result, oil must pass through the grooves at a predetermined rate of flow ($Q_1$) and with a predetermined temperature rise (Δt). The formula for $Q_1$ gives the rate of flow through a single groove. The total flow through a bearing will be the value of $Q_1$ multiplied by the number of grooves in the bearing. It is only by this control of oil film temperature rise and rapid dissipation of the heat directly from the oil film, that it is possible to provide a bearing in which a spindle or other journal can be rotatably supported with substantial elimination of radial displacement with resulting improvement in dimensional precision of work produced by the machine and with operating temperatures equal to or less than that of conventional bearings.

The peripheral width of each pad as well as other dimensions and factors entering into the design and operation of this bearing may be determined by equations developed as a part of this invention and based on actual reduction to practice and successful operation of the bearing.

Sir Isaac Newton determined that the force required to effect relative movement between two parallel surfaces, separated from each other by a fluid, was a measure of the internal friction of the fluid, and that this force was proportional to the surface area and the relative speed and inversely proportional to the distance between the surfaces. This force is expressed in the following formula taken from Page 6 of Dudley D. Fuller's "Theory and Practice of Lubrication for Engineers":

In this formula F is the force required to move two surfaces relative to one another, $\mu$ is the viscosity of the oil, A is the area of a bearing pad, $v$ is the speed of the moving member, and $h$ is the thickness of the oil formed between the relatively moving surfaces.

$$F = \mu A \frac{v}{h}$$

Other formulae based on the above formula make use of the following symbols:

$l$ is the peripheral width of the bearing pad and, therefore, the length of the oil film formed thereon in inches;

$b$ is the axial length of said oil film and pad in inches;

B.t.u. is the British thermal unit;

J is the mechanical equivalent of heat in inch pounds per B.t.u.;

Q is the rate of flow of the oil film in cubic inches per second;

$Q_1$ is the rate of flow of circulating oil in cubic inches per second;

ΔT is the allowable temperature rise in the oil film in ° F.;

Δt is the temperature rise in the circulating oil as it passes through from one end of the bearing to the other;

ΔP is the pressure rise in the oil film;

γ is the weight density of the oil in pounds per cubic inch;

C is the specific heat of the oil;

μ is the viscosity in reyns.; and

ψ is the co-efficient of expansion in the oil film per ° F.

Multiplying both sides of the above Newton equation by v/J will introduce the heat factor $$F\frac{v}{J} = \mu A \frac{v^2}{hJ}$$

and $$A = lb$$

and the volume (Q) of oil flowing in the oil film $$Q = \frac{vhb}{2}$$

$$B.t.u. = Q\Delta T\gamma C$$

$$Q\Delta T\gamma C \frac{vhb}{2}\Delta T\gamma C$$

Equating $$\frac{\mu lbv^2}{hJ} = \frac{vhb}{2}\Delta T\gamma C$$

Solving for $l$ $$l = \frac{\Delta T h^2 \gamma C J}{2\mu v}$$

The rate of flow of circulating oil required may be determined by solving the equation:

$$Q_1 = \frac{hbv\Delta T}{2\Delta t}$$

The formula for the relationship between pressure and other factors in parallel surface bearings, may be derived from the simplified Reynolds' equation:

$$\frac{d}{dx}\left(\frac{h^3}{\mu}\frac{dp}{dx}\right) = 6U\frac{dh}{dx}$$

The above formula was taken from page 41 of Pinkus Sternlicht "Theory of Hydrodynamic Lubrication," Copyright 1961 by McGraw-Hill Book Company, Inc., New York.

Or directly from the formula for flow through slots:

$$Q = \frac{\Delta P b h^3}{12\mu l}$$

The above formula was taken from page 17 of Dudley D. Fuller's "Theory and Practice of Lubrication for Engineers."

Equating the volume increase of the oil film for a rise in temperature of ΔT ° F.

$$\frac{\Delta T \psi hbv}{2} = \frac{\Delta P b h^3}{12\mu l}$$

Substituting ΔT from the formula line 26 of page 17 in which:

$$\Delta T = \frac{2\mu v l}{h^2 \gamma C J}$$

Then:

$$\frac{2\mu v l \psi hbv}{2h^2 \gamma C J} = \frac{\Delta P b h^3}{12\mu l}$$

The maximum pressure will occur at the center of the pad. The flow of fluid in response to this increase in pressure will occur both forward and backward from the center of the pad. Thus, the maximum distance of flow is not $l$, but $l/2$.

Therefore:

$$\Delta P = \frac{3(\mu v l)^2 \psi}{h^4 \gamma C J}$$

In order to correct the variables not considered in the above formula and for non-symmetry of the pressure profile, the formula for ΔP should be written:

$$\Delta P = \frac{3(\mu v l)^2 \psi}{h^4 \gamma C J} K$$

Regardless of the value of (K), the formula illustrates that the pressure varies indirectly with the fourth power of the film thickness and this indicates a very hard film compared to the wedge-shaped oil film, wherein, the pressure varies indirectly with the square of the film thickness as given by the following formula for a wedge-shaped oil film:

$$P = \frac{6\mu v l}{h^2} K_p$$

The above formula was taken from page 170 of Dudley D. Fuller's "Theory and Practice of Lubrication for Engineers."

The above formulae may be the basis for the derivation of the equations for determining the value of any of the various factors which make up the equations.

It is to be understood that changes may be made in details of construction without departing from the spirit and scope of the invention as defined by the following claims.

I claim:

1. A bearing system comprising
   (a) at least one bearing member,
   (b) a journal rotatably supported in said bearing member,
   (c) peripherally spaced pre-formed grooves in said bearing member defining rigid peripherally spaced bearing pads,
   (d) said bearing member having means adjusting the same radially to form between each bearing pad and said journal an oil film of substantially uniform and irreducible thinness entirely across the periphery of the pad for the full range of operating conditions of said bearing member and journal whereby to prevent radial displacement of said journal by the external radial forces acting on said journal for the full range,
   (e) a supply of oil having flow through said grooves from one end to the other in excess of that needed for lubrication, a minor part of which passes between each of said pads and said journal and forms said oil film in response to rotation of said journal,
   (f) the volume of said oil film between each bearing pad and said journal being limited due to the fit between said pads and said journal and, therefore, subject to rapid increase in temperature.
   (g) means to control the temperature rise in said oil film regardless of the thinness of said oil film,
   (h) which consists in the circumferential dimension of each paid being limited in accordance with the limited oil film thickness, to a length wherein each oil film is discharged to one of said grooves while its temperature is well below the vapor point of the oil in the oil film,
   (i) the volume of the oil flowing through each groove being sufficient to quench the respective heated oil film as it is discharged from the adjacent pad, whereby the discharging of the heated oil film into the groove produces substantially no temperature rise in the oil supplied to the next adjacent pad from the same groove.

2. Apparatus of the type described n claim 1 in which the volume of oil flowing through each groove is sufficient to directly dissipate the heat generated in each oil film from the oil film so that the bearing and journal remain cool.

3. Apparatus of the type described in claim 1 in which the optimum peripheral dimension $l$ of bearing pad is determined by the formula $$l = \frac{\Delta T h^2 \gamma C J}{2\mu v}$$

4. Apparatus of the type described in claim 1 in which the co-acting surfaces of the bearing member and journal are parallel.

5. Apparatus of the type described in claim 4 in which a load sustaining pressure is generated in the oil film by the tendency of the oil film to expand as a result of generation of heat in said oil film.

6. Apparatus of the type described in claim 4 in which the load sustaining pressure generated between the parallel surfaces is determined by the formula $$\Delta P = \frac{3(\mu v l)^2 \psi}{h^4 \gamma C J} K$$

7. Apparatus of the type described in claim 1 in which the oil is circulated through each groove at an optimum rate determined by the formula $$Q_1 = \frac{hbv\Delta T}{2\Delta t}$$

No references cited.

DAVID J. WILLIAMOWSKY, *Primary Examiner.*

FRANK SUSKO, *Examiner.*

UNITED STATES PATENT OFFICE
CERTIFICATE OF CORRECTION

Patent No. 3,285,679                          November 15, 1966

Harold E. Balsiger

It is hereby certified that error appears in the above numbered patent requiring correction and that the said Letters Patent should read as corrected below.

Column 2, line 4, for "this" read -- that --; column 3, line 44, for "volumn" read -- volume --; column 5, line 24, for "radical" read -- radial --; column 6, line 21, for "and" read -- end --; column 9, line 62, after "formula" insert -- on --; line 75, for "1/2" read -- $\ell/2$ --; column 10, line 5, for "the", first occurrence, read -- for --; line 61, for "paid" read -- pad --; line 73, for "n" read -- in --.

Signed and sealed this 11th day of March 1969.

(SEAL)
Attest:

Edward M. Fletcher, Jr.                                    EDWARD J. BRENNER
Attesting Officer                                           Commissioner of Patents